United States Patent [19]

Hanson et al.

[11] Patent Number: 5,328,975
[45] Date of Patent: Jul. 12, 1994

[54] ULTRAVIOLET RADIATION ABSORBING COATING

[75] Inventors: Michael E. Hanson, Harmar Township, Allegheny County; Robert M. Hunia, Kittanning; Chia-Cheng Lin, Allison Park, all of Pa.

[73] Assignee: PPG Industries, Inc., Pittsburgh, Pa.

[21] Appl. No.: 42,184

[22] Filed: Apr. 2, 1993

[51] Int. Cl.$^5$ .............................. C08G 77/04
[52] U.S. Cl. .............................. 528/29; 528/10;
528/32; 528/43; 528/41; 528/395; 528/411;
427/375; 427/376.2; 427/372.2; 427/387
[58] Field of Search .............. 528/10, 32, 43, 41,
528/395, 411, 29; 427/375, 376.2, 372.2, 387

[56] References Cited

U.S. PATENT DOCUMENTS

| | | |
|---|---|---|
| 3,531,677 | 9/1970 | Loughridge . |
| 4,275,118 | 6/1981 | Baney et al. ............... 428/447 |
| 4,278,632 | 7/1981 | Yoldas . |
| 4,741,931 | 5/1988 | Lin et al. . |
| 4,753,827 | 6/1988 | Yoldas et al. . |
| 4,754,012 | 6/1988 | Yoldas et al. . |
| 4,814,017 | 3/1989 | Yoldas et al. . |
| 4,839,454 | 6/1989 | Lin et al. . |

OTHER PUBLICATIONS

Cheng, Y-C and Hench, L. L.; "Physical and Structural Evolution of Sol-Gel Derived TiO$_2$-SiO$_2$ Glasses"; Mat. Res. Soc. Symp. Proc. vol. 121, pp. 593-596; 1988.
Fernandez, A. et al.; "Size and Support Effects in the Photoelectron Spectra of Small TiO$_2$ particles"; Surface and Interface Analysis, vol. 18, pp. 392-396 (1992).

Primary Examiner—Melvyn I. Marquis
Attorney, Agent, or Firm—Donna L. Seidel

[57] ABSTRACT

An organoalkoxysilane/metal oxide sol-gel composition and method for its production are disclosed whereby an organoalkoxysilane of the general formula $$R_xSi(OR')_{4-x}$$

wherein R is an organic radical, R' is a low molecular weight alkyl radical, and x is less than 4 and may be zero, is partially hydrolyzed in organic solution and reacted with a titanium alkoxide of the general formula Ti(OR")$_4$ wherein R" is a lower alkyl radical. The composition is hydrolyzed, dried and heat treated to form a silicon oxide/titanium oxide abrasion-resistant coating on a substrate with high ultraviolet radiation absorbance.

18 Claims, 1 Drawing Sheet

ULTRAVIOLET RADIATION ABSORBING COATING

The present invention relates generally to the art of ultraviolet radiation (UV) resistant and abrasion resistant coatings, and more particularly to the art of such coatings formulated without cerium oxide for UV attenuation.

U.S. Pat. No. 3,531,677 to Loughridge discloses reducing hydrogen emission from the inner surface of a glass bulb containing a high-pressure mercury arc by providing an ultraviolet-absorbing glaze on the quartz. The glaze is made of finely divided silica frit with about 2 to 10 percent by weight of finely-divided alumina and about 0.5 to 10 percent of a powdered material such as titanium, cerium, chromium or iron oxide, which absorbs UV.

The present invention recognizes that the UV absorbing spectrum of $TiO_2$ depends on the size and type of $TiO_2$ crystals. Finding that a pure $TiO_2$ film will agglomerate to form larger crystals, and a discontinuous coating, at 1000° C., the present invention involves nanocomposite $TiO_2/SiO_2$ coating compositions for UV absorption and methods for making them, including temperature treatment cycles.

Figure 1:
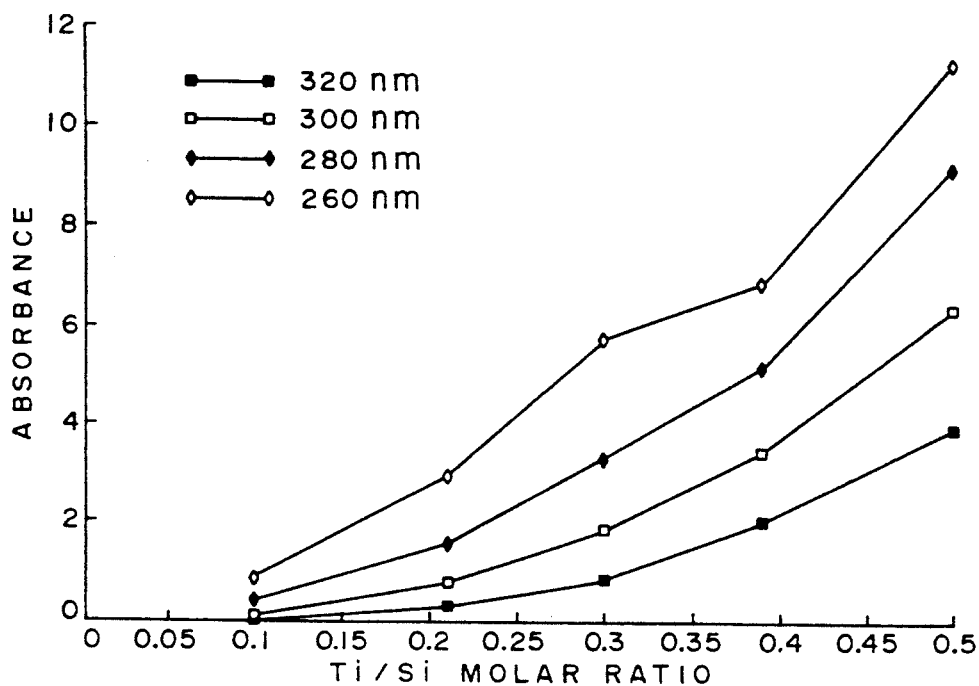
FIG. 1 illustrates the absorbance, per micron of coating thickness, of ultraviolet radiation in the range of 260 to 320 nanometers, for coatings having molar ratios of 0.1 to 0.5 titania to silica in the coating composition.

A sol-gel system for producing a silane/titania composition may be prepared in the following manner. First, an alkoxysilane of the general formula $R_xSi(OR')_{4-x}$, wherein R is an organic radical, R' is a low molecular weight alkyl radical, and x is less than 4 and maybe zero, is partially hydrolyzed. The alkoxysilanes of the present invention may contain functional groups as well. Preferably, R is an organic radical selected from the group consisting of low molecular weight, preferably 1 to 6 carbon atoms, alkyl or vinyl, methoxyethyl, phenyl, γ-glycidoxypropyl or γ-methacryloxypropyl, and R' is selected from the group consisting of methyl, ethyl, propyl and butyl. Preferred organoalkoxysilanes include those wherein R is methacryloxypropyl and R' is methyl. A particularly preferred organoalkoxysilane is methacryloxypropyltrimethoxysilane. Another preferred organoalkoxysilane is γ-glycidoxypropyl trimethoxysilane. Mixtures of organoalkoxysilanes may also be preferred. A preferred alkoxysilane is tetraethoxysilane (TEOS). The sol-gel composition may also comprise colloidal silica and/or colloidal titania.

The organoalkoxysilane of the present invention is preferably dissolved in an organic solvent, preferably an alcohol, and partially hydrolyzed with water according to the following general reaction $$R_xSi(OR')_{4-x} + yH_2O \rightarrow R_xSi(OR')_{4-x-y}(OH)_y + yR'OH$$

wherein y is less than 4−x.

After the organoalkoxysilane is partially hydrolyzed, a titanium alkoxide is added having the following general formula $$Ti(OR'')_4$$

wherein R" is a low molecular weight alkyl radical, preferably methyl, ethyl, propyl, isopropyl or butyl. The titanium alkoxide may be in dimer or higher condensed form so long as alkoxy groups remain reactive with silanol groups of the partially hydrolyzed organoalkoxysilane to copolymerize. The titanium alkoxide reacts with the partially hydrolyzed organoalkoxysilane to form a network of silicon-oxygen-titanium bonds according to the following general reaction

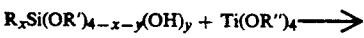
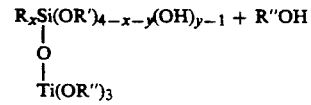

When the titanium alkoxide has completely reacted with the partially hydrolyzed organoalkoxysilane, additional water can be added to further hydrolyze the composition, i.e. to convert remaining alkoxy groups of either the alkoxysilane or the metal alkoxide to hydroxyl groups according to the reaction

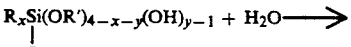
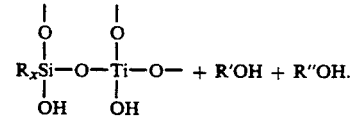

The reactions of organoalkoxysilane and titanium alkoxides are discussed in detail in U.S. Pat. No. 4,753,827 to Yoldas et al. and U.S. Pat. No. 4,839,454 to Lin et al., the disclosures of which are incorporated herein by reference.

Preferably, the hydrolyzed composition is applied by any conventional procedure such as spraying, dipping or flow coating onto a surface of a substrate. The coating composition is dried to remove alcohol and water solvents, and then heated to promote the continued condensation polymerization of the composition, and curing to a dense glassy abrasion resistant film which absorbs ultraviolet radiation. Subsequent to heat treatments above 500° C. the film is free of organic residue, composed entirely of silicon and titanium oxides.

The properties of the finished film are dependent upon oxide composition and process heat treatment temperature and time. As the concentration of titanium oxide in tile silicon oxide/titanium oxide system is varied from 5 to 50 mole percent, the specific UV absorption increases as shown in FIG. 1 for a given constant heat treatment temperature and time.

It is also found that the high temperature durability is diminished as the mole percent of titanium oxide is increased, where films with greater than 33 mole percent titanium oxide will turn visibly opaque within 24 hours at temperatures exceeding 1000° C. For this reason, titanium oxide concentrations from 20 to 25 mole percent are the most suitable for quartz substrates subject to very high temperatures (>1000° C.) during service. Higher concentrations of titanium oxide may be suitable for a lower service temperature. As the concentration of titanium oxide or other high refractive index oxide is increased, the film becomes more reflective. This causes diminished visible light output from lamps with such a coating. A preferred concentration of titanium oxide in the coating therefore maximizes UV absorption and minimizes reflectance properties. Titanium oxide concentrations from 20 to 25 mole percent also satisfy this consideration.

Figure 2:
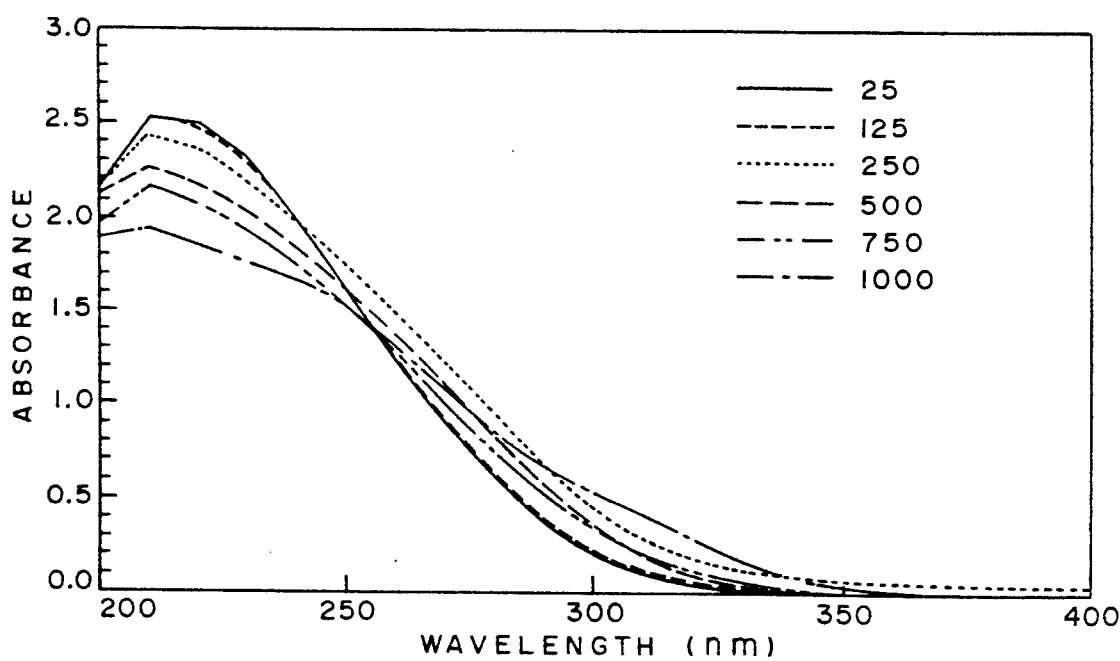
FIG. 2 illustrates the absorbance of ultraviolet radiation as a function of wavelength over the range of 200 to 400 nanometers for a coating composition with a titania/silica ratio of 0.25 which is cured for 5 minutes at temperatures ranging from 25 to 1000° C.

The UV absorption spectrum of a given titanium oxide/silicon oxide is found to be dependent upon heat treatment temperature and time. FIG. 2 shows an increase in the relative absorption of a coating between 300 and 340 nanometers as a 5 minute heat treatment temperature is increased from room temperature to 1000° C. This effect may be demonstrated in shorter times at higher temperatures and more time at lower temperatures. This effect has significant implications to quartz discharge lamps, since they produce large amounts of UV radiation at 313 nanometers.

X-ray diffraction data indicate an increase in the amount of crystallized anatase in the coatings with increased time and temperature during curing. The crystal size of the anatase increases as the heat treatment becomes hotter and longer. The resulting nanocomposite shows anatase crystal sizes growing in the 10 to 30 nanometer range as the UV absorption in the 300 to 340 nanometer range increases. It is therefore thought that such a controlled increase in the nanocrystal size is responsible for the supplemental UV absorption activity in this region.

This invention involves high temperature quartz discharge lamps that are heat treated with a gas/oxygen flame for 5–10 seconds, with or without a lower temperature pre-heat to help prevent trapping of organic compounds during the initial stages of curing. The flame has the advantage of fast processing times and high temperatures without sacrificing the metal lead wires of the lamp. However, heat treatment can also be performed by placing the entire lamp in a high temperature oven, by blowing the lamp with high temperature air, by electrifying and operating the lamp in air, or by other methods.

Different coating formulations will result in various absorbances per unit thickness due to the concentration of titanium oxide, density of tile coating, or both. In addition, the maximum thickness of each coating application may be limited by stress cracking and curing chemistry. Sufficiently high UV absorbance of the total coating system on a lamp is therefore accomplished by applying multiple coats, the number or which is dependent upon the application properties and absorbance of the specific coating formulation as well as the UV emission properties of the lamp.

The present invention will be further understood from the descriptions of specific examples which follow.

EXAMPLE I

A composition is prepared by adding 15 grams of ethyl acetate, 1.8 grams of deionized water and 1 drop of nitric acid to 25 grams of methacryloxypropyltrimethoxysilane, stirring for one half hour, adding 25 grams of titanium (IV) isopropoxide, stirring for an additional half hour, adding 5.4 grams of deionized water, stirring for another half hour, and finally adding 50 grams of ethyl acetate with continued stirring.

EXAMPLE II

A composition is prepared by adding 12.8 grams of colloidal silica, 25 grams of 2-propanol and 1 drop of nitric acid to 25 grams of methacryloxypropyltrimethoxysilane, stirring for one half hour, adding 50 grams of organic titanate, stirring for an additional half hour, and adding 25 grams of 2-propanol with continued stirring. The organic titanate is Tyzor® GBA, a proprietary mixture from DuPont of titanium on the ester complexes in a solvent comprising methanol, isopropanol and n-butanol.

EXAMPLE III

The solutions of Examples I and II are used to produce films with low ultraviolet transmittance. Quartz slides are dipped into the respective solutions and are dried for one minute at ambient temperature to form clear films. The clear films are then fired by a high temperature flame by exposing them for 20 seconds at a distance of 2 inches. The films initially darken, then gradually clear. Both have high absorbance of ultraviolet radiation; at 320 Angstroms, the absorbance is 1.1 for a film from the composition of Example I, and 1.7 for a film from the composition of Example II.

EXAMPLE IV

A composition as in Example I is modified for application by spraying rather than dipping by adding 7.5 grams of triethylene glycol to 50 grams of the composition, stirring at ambient temperature for one half hour and outgassing for 10 minutes under house vacuum (approximately 400 millimeters of mercury). The modified composition is sprayed using 65 pounds of air pressure with no clogging of the spray gun tip. The coating dries with less dust formation and flaking than without the triethylene glycol.

EXAMPLE V

A first composition is prepared by adding 51.54 grams of tetraethoxysilane to 52.04 grams of 1-propanol and stirring. A second composition is prepared by adding 4.46 grams of water and 0.215 grams of 70 percent nitric acid to 52.04 grams of 1-propanol and stirring for at least 5 seconds. These two compositions are then mixed together with continued stirring one half hour. A third composition comprising 24.69 grams of titanium (IV) isopropoxide and 17.35 grams of 1-propanol is then added to this mixture with continued stirring for 5 minutes. Finally, a mixture of 1.49 grams water and 17.35 grams 1-propanol is added with continued stirring. The final composition is loaded into the solution reservoir of a pressurized air spray gun. Atomizing air pressure is at least 50 pounds per square inch (psi). The solution delivery rate is adjusted to 0.5 to 1.5 milliliters per minute. The lamp is flame cleaned and cooled before coating. With the lamp spinning at approximately 3 revolutions per second, the spray gun is activated for a period of 6 seconds with a single pass reciprocation of the nozzle over the spinning lamp. The rotating lamp is then flame-cured for 9 seconds, bringing the coated lamp to an orange incandescent state, indicating a temperature of 800°–1000° C. The typical absorption of this coating at 320 nanometers is 0.55, as measured by a Perkin Elmer Lambda 9 UV-Visible spectro photometer. The coating procedure is repeated 4 times, so that the 4-layer coating achieves an absorbance at 320 nanometers of 2.2.

EXAMPLE VI

A first composition is prepared by adding 36.47 grams γ-glycydoxypropyltrimethoxysilane, 30.91 grams of 34 percent colloidal silica in propylene glycol monomethyl ether, and 7.7 grams of triethylene glycol to 61.82 grams of 1-propanol while stirring. In a separate mixture, 2.78 grams of water, 7.7 grams of triethylene glycol and 0.170 grams of 70 percent nitric acid are added to 52.04 grams of 1-propanol while stirring. The second mixture is added to the first composition with continued stirring for one half hour. Another mixture of 30.8 grams of titanium (IV) isopropoxide, 2.6 grams of triethylene glycol and 17.35 grams of 1-propanol is then added to the above, with continued stirring for 5 minutes. Finally, a mixture of 1.85 grams of water, 2.6 grams of triethylene glycol, and 20.6 grams of 1-propanol is added with continued stirring. The final composition is loaded into the spray gun reservoir and a lamp is cleaned as in Example V. The spray gun parameters are set so that the absorbance of the film on a quartz tube is 0.75 at 320 nanometers. The heat treatment stage is preceded by a 30 second forced hot air treatment (500° C.) from a heat gun located ¼ inch from the spinning lamp. The hot air is then removed and the flame immediately activated, firing the pre-heated coating for 6 seconds. The lamp is then cooled for 25 seconds and processed again. Three coats are applied such that where the final coating absorption at 320 nanometers is 2.25.

EXAMPLE VII

A first composition is prepared by adding 111.8 grams of tetraethoxysilane to a mixture 108.6 grams of 1-propanol, 14.52 grams of water, and 0.174 ml. 70 percent nitric acid and stirring. In a separate mixture, 40.2 grams of titanium (IV) isopropoxide is added to a mixture of ].62.8 grams of 1-propanol, 3.63 grams of water, and 0.044 ml. 70 percent nitric acid and stirred. After each solution has been stirred for 1 hour, the second solution is added to the first with continued stirring. Finally, 27.17 grams of triethylene glycol is added to the total mixture with continued stirring. The final composition is loaded into the spray gun reservoir and a lamp is cleaned as in Example V. The spray gun parameters are set so that the absorbance of the film on a quartz tube is 0.38 at 320 nm. The heat treatment stage is performed in the same manner as in Example VI. Six coats are applied such that the final coating absorption at 320 nm is 2.25.

EXAMPLE VIII

A first composition is prepared by stirring 35.4 grams of γ-glycydoxypropyltrimethoxysilane and adding a mixture of 20 grams of 1-propanol, 13.5 grams of water, and one drop of 70 percent nitric acid with continued stirring for ¼ hour. A second mixture of 36 grams of colloidal titania and 20 grams of water are then slowly added to the first mixture with rapid stirring for ½ hour. The colloidal titania is available as Nalco TX-2588, with a pH of 9.8, total solids of 11.7 percent and nominal particle diameter of 20 nanometers. The mixture is finally diluted with 60 grams of 1-propanol, 40 grams of water and 40 grams of diacetone alcohol, and 0.4 grams of surfactant. The final composition is placed in a container and a flat quartz slide is dipped into the solution and emersed at 6 inches per minute. The wet coating was wiped from the second surface of the quartz slide. The coating on the first surface was air dried for 2 minutes at room temperature, pre-heated in a 500° C. oven for 5 minutes, then heated in a 1000° C. oven for 5 minutes. The UV absorption at 320 run for a single coating is 0.8.

EXAMPLE IX

A first composition is prepared by adding 13.64 grams of tetraethoxysilane to 27.54 grams of 1-propanol while stirring. To this composition is added 1.180 grams of water, then 0.059 milliliters of 70 percent nitric acid, with continued stirring for ¼ hour. Then 7.0 grams of titanium (IV) isopropoxide, then 1.61 grams of zirconium (IV) isopropoxide are added with continued stirring. Finally, a mixture of 11.8 grams of 1-propanol and 0.505 grams of water are added with continued stirring. The final composition is placed in a container and a flat quartz slide is dipped into the solution and emersed at 6 inches per minute. The wet coating was wiped from the second surface of the quartz slide. The coating on the first surface was air dried for 2 minutes at room temperature, pre-heated in a 500° C. oven for 5 minutes, then heated in a 1000° C. oven for 5 minutes. The UV absorption at 320 nm for a single coating is 0.3.

The above examples are offered only to illustrate the present invention. Various other organoalkoxysilane and titanium compounds such as colloidal $TiO_2$ and titanium complexes, such as titanium acetylacetonate may be hydrolyzed and reacted in various concentrations and solvents to form titania/silica UV absorbing coating compositions in accordance with the present invention. Various other glycols or similar solvents may be added in varying amounts, particularly when the composition is to be applied by spraying. The coating compositions of the invention may further comprise other constituents, specifically other metal oxides such as tin oxide or zirconia. The scope of the present invention is defined by the following claims.

We claim:

1. A coating composition for the absorption of ultraviolet radiation comprising the hydrolytic condensation polymerization reaction product of an organoalkoxysilane of the general formula $$R_xSi(OR')_{4-x}$$

wherein R is an organic radical, R' is a low molecular weight alkyl radical and x is less than 4 and may be zero, and a titanium alkoxide or colloidal titania, wherein the molar ratio of titania to silica in the reaction product is from 0.1 to 0.5 and the absorbance of the coating at 320 nanometers is at least 0.5 per micron of coating thickness.

2. A composition according to claim 1, wherein R is selected from the group consisting of lower alkyl, vinyl, methoxyethyl, phenyl, γ-glycidoxypropyl and methacryloxypropyl.

3. A composition according to claim 1, wherein R' is selected from the group consisting of methyl, ethyl, propyl and butyl.

4. A composition according to claim 3, wherein R is γ-glycydoxypropyl and R' is methyl.

5. A composition according to claim 3, wherein x is 0, and R' is ethyl.

6. A composition according to claim 1, wherein said metal alkoxide has the general formula Ti(OR")$_4$ wherein R" is a low molecular weight alkyl radical.

7. A composition according to claim 6, wherein the titanium alkoxide is titanium isopropoxide, Ti(OC$_3$H$_7$)$_4$.

8. A composition according to claim 1, further comprising an organic solvent additive.

9. A composition according to claim 8, wherein said solvent additive is a glycol.

10. A composition according to claim 9, wherein said solvent additive is triethylene glycol.

11. A method of making an ultraviolet radiation absorbing coating composition comprising the steps of:
   a. partially hydrolyzing in organic solution an organoalkoxysilane of the general formula $$R_xSi(OR')_{4-x}$$

wherein R is an organic radical, R' is a low molecular weight alkyl radical, and x is less than 4 and may be zero;
   b. adding to said partially hydrolyzed organoalkoxysilane a titanium alkoxide or colloidal titania;
   c. reacting said titanium alkoxide or titania with said partially hydrolyzed organoalkoxysilane;
   d. adding additional water to hydrolyze the composition;
   e. drying the composition; and
   f. heating the composition to at least 750° C. to produce an absorbance at 320 nanometers of at least 0.5 per micron of coating thickness.

12. A method according to claim 11, wherein the step of partially hydrolyzing said organoalkoxysilane is carried out in alcohol.

13. A method according to claim 12, wherein the step of partially hydrolyzing said organoalkoxysilane is carried out in 2-propanol.

14. A method according to claim 12, wherein the step of partially hydrolyzing said organoalkoxysilane is carried out in ethanol.

15. A method according to claim 12, wherein said metal alkoxide is titanium isopropoxide.

16. A method according to claim 15 further comprising the step of applying said composition to a surface of a substrate, wherein said drying and heating steps are carried out on said substrate thereby forming a coating on said substrate.

17. A method according to claim 16, wherein said heating step is carried out between 750° C. and 1000° C.

18. A method according to claim 17, wherein said heating step carried out between 750° C. and 1000° C. produces crystallized anatase of 10 to 30 nanometer particle size.

* * * * *